United States Patent
Lenc et al.

(10) Patent No.: US 11,676,035 B2
(45) Date of Patent: Jun. 13, 2023

(54) LEARNING NON-DIFFERENTIABLE WEIGHTS OF NEURAL NETWORKS USING EVOLUTIONARY STRATEGIES

(71) Applicant: DeepMind Technologies Limited, London (GB)

(72) Inventors: Karel Lenc, London (GB); Karen Simonyan, London (GB); Tom Schaul, London (GB); Erich Konrad Elsen, San Francisco, CA (US)

(73) Assignee: DeepMind Technologies Limited, London (GB)

( * ) Notice: Subject to any disclaimer, the term of this patent is extended or adjusted under 35 U.S.C. 154(b) by 328 days.

(21) Appl. No.: 16/751,169

(22) Filed: Jan. 23, 2020

(65) Prior Publication Data
US 2020/0234142 A1    Jul. 23, 2020

Related U.S. Application Data (60) Provisional application No. 62/796,066, filed on Jan. 23, 2019.

(51) Int. Cl.
  *G06N 3/08* (2023.01)
  *G06N 3/086* (2023.01)
  *G06N 3/044* (2023.01)

(52) U.S. Cl.
  CPC ............... *G06N 3/086* (2013.01); *G06N 3/08* (2013.01); *G06N 3/044* (2023.01)

(58) Field of Classification Search
  CPC ......... G06N 3/086; G06N 3/0445; G06N 3/08
  USPC .......................................................... 706/25
  See application file for complete search history.

(56) References Cited

U.S. PATENT DOCUMENTS

| | | | |
|---|---|---|---|
| 7,243,056 B2* | 7/2007 | Olhofer | G06N 3/126 703/7 |
| 2019/0188571 A1* | 6/2019 | Conti | G06N 3/04 |
| 2020/0134461 A1* | 4/2020 | Chai | G06N 3/088 |

OTHER PUBLICATIONS

Mandischer et al., "A comparison of evolution strategies and backpropagation for neural network training", Neurocomputing 42 (2002) 87-117 (Year: 2002).*

Kumar, "On weight initialization in deep neural networks", 2017 (Year: 2017).*

Mathur et. al. "Hydra: A Peer to Peer Distributed Training & Data Collection Framework", 2018 (Year: 2018).*

Salimans et. al., "Evolution Strategies as a Scalable Alternative to Reinforcement Learning", 2017 (Year: 2017).*

(Continued)

*Primary Examiner* — Omar F Fernandez Rivas
*Assistant Examiner* — Selene A. Haedi
(74) *Attorney, Agent, or Firm* — Fish & Richardson P.C.

(57) ABSTRACT

Methods, systems, and apparatus, including computer programs encoded on computer storage media, for training a neural network. The neural network has a plurality of differentiable weights and a plurality of non-differentiable weights. One of the methods includes determining trained values of the plurality of differentiable weights and the non-differentiable weights by repeatedly performing operations that include determining an update to the current values of the plurality of differentiable weights using a machine learning gradient-based training technique and determining, using an evolution strategies (ES) technique, an update to the current values of a plurality of distribution parameters.

20 Claims, 5 Drawing Sheets

(56) References Cited

OTHER PUBLICATIONS

International Preliminary Report on Patentability in International Appln. No. PCT/EP2020/051623, dated Aug. 5, 2021, 9 pages.
Bell et al., "Thrust: A Productivity-Oriented Library for CUDA," GPU Computing Gems, 2012, 359-371.
Bellec et al., "Deep Rewiring: Training very sparse deep networks," https://arxiv.org/abs/1711.05136v1, Nov. 2017, 22 pages.
Blelloch, "Prefix Sums and Their Applications." Technical report, Nov. 1990, 25 pages.
Buchlovsky et al., "TF-Replicator: Distributed Machine Learning for Researchers," https://arxiv.org/abs/1902.00465, Feb. 2019, 12 pages.
Chen et al., "Combining Evolution Strategy and Gradient Descent Method for Discriminative Learning of Bayesian Classifiers," Proceedings of the 11th Annual Genetic and Evolutionary Computation Conference, Jul. 2009, 507-514.
Chollet, "Xception: Deep Learning with Depthwise Separable Convolutions," https://arxiv.org/abs/1610.02357v2, Oct. 2016, 14 pages.
Cui et al., "Evolutionary Stochastic Gradient Descent for Optimization of Deep Neural Networks," https://arxiv.org/abs/1810.06773, Oct. 2018, 15 pages.
Gale et al., "The State of Sparsity in Deep Neural Networks," https://arxiv.org/abs/1902.09574, Feb. 2019, 15 pages.
Glorot et al., "Understanding the difficulty of training deep feedforward neural networks," Proceedings of the 13th International Conference on Artificial Intelligence and Statistics, Mar. 2010, 249-256.
Han et al., "EIE: Efficient Inference Engine on Compressed Deep Neural Network," https://arxiv.org/abs/1602.01528v2, May 2016, 12 pages.
Hansen et al., "Completely Derandomized Self-Adaptation in Evolution Strategies," Evolutionary Computation, Jun. 2001, 9(2):159-195.
Harris et al., "Parallel Prefix Sum (Scan) with CUDA," GPU gems, retrieved from URL <https://www.eecs.umich.edu/courses/eecs570/hw/parprefix.pdf>, Apr. 2007, 21 pages.
Houthooft et al., "Evolved Policy Gradients," https://arxiv.org/abs/1802.04821v2, Apr. 2018, 18 pages.
Igel et al., "Genesis of Organic Computing Systems: Coupling Evolution and Learning," Organic Computing, Jan. 2009, 25 pages.
Igel, "Neuroevolution for Reinforcement Learning Using Evolution Strategies," The 2003 Congress on Evolutionary Computation, Dec. 2003, 2588-2595.
Ioffe et al., "Batch Normalization: Accelerating Deep Network Training by Reducing Internal Covariate Shift," https://arxiv.org/abs/1502.03167, Mar. 2015, 11 pages.
Jang et al., "Categorical Reparameterization with Gumbel-Softmax," https://arxiv.org/abs/1611.01144, Aug. 2017, 13 pages.
Kalchbrenner et al., "Efficient Neural Audio Synthesis," Proceedings of the 35th International Conference on Machine Learning, Jul. 2018, 80:10 pages.
Kingma et al., "Adam: A Method for Stochastic Optimization," https://arxiv.org/abs/1412.6980v1, Dec. 2014, 9 pages.
Krizhevsky, "Learning Multiple Layers of Features from Tiny Images," Technical report, Apr. 2009, 60 pages.
LeCun et al., "Gradient-Based Learning Applied to Document Recognition," Proceedings of the IEEE, Nov. 1998, 86(11):2278-2324.
LeCun et al., "Optimal Brain Damage," Advances in Neural Information Processing Systems, 1990, 598-605.
Lehman et al., "ES Is More Than Just A Traditional Finite-Difference Approximator," Proceedings of the Genetic and Evolutionaiy Computation Conference, Jul. 2018, 450-457.
Louizos et al., "Learning Sparse Neural Networks through L0 Regularization," https://arxiv.org/abs/1712.01312, Jun. 2018, 13 pages.
Maddison et al., "The Concrete Distribution: A Continuous Relaxation of Discrete Random Variables," https://arxiv.org/abs/1611.00712v3, Mar. 2017, 20 pages.
Maheswaranathan et al., "Guided evolutionary strategies: escaping the curse of dimensionality in random search," https://arxiv.org/abs/1806.10230v3, Dec. 2018, 16 pages.
Mandischer, "A comparison of evolution strategies and backpropagation for neural network training," Neurocomputing, Jan. 2002, 42(1-4):87-117.
Mania et al., "Simple random search provides a competitive approach to reinforcement learning," https://arxiv.org/abs/1803.07055, Mar. 2018, 22 pages.
Molchanov et al., "Variational Dropout Sparsifies Deep Neural Networks," Proceedings of the 34th International Conference on Machine Learning, Aug. 2017, 70:10 pages.
Narang et al., "Exploring Sparsity in Recurrent Neural Networks," https://arxiv.org/abs/1704.05119v2, Nov. 2017, 10 pages.
PCT International Search Report and Written Opinion in International Appln. No. PCT/EP2020/051623, dated Apr. 6, 2020, 14 pages.
Real et al., "Regularized Evolution for Image Classifier Architecture Search," https://arxiv.org/abs/1802.01548v1, Feb. 2018, 15 pages.
Reynolds et al., "Open sourcing Sonnet—a new library for constructing neural networks," Apr. 7, 2017, retrieved Apr. 20, 2020, retrieved from URL <https://deepmind.com/blog/open-sourcing-sonnet/>, 4 pages.
Ros et al., "A Simple Modification in CMA-ES Achieving Linear Time and Space Complexity," International Conference on Parallel Problem Solving from Nature, Sep. 2008, 296-305.
Salimans et al., "Evolution Strategies as a Scalable Alternative to Reinforcement Learning," https://arxiv.org/abs/1703.03864, Sep. 2017, 13 pages.
Schaul et al., "High Dimensions and Heavy Tails for Natural Evolution Strategies," Proceedings of the 13th Annual Conference on Genetic and Evolutionary Computation, Jul. 2011, 845-852.
Smith et al., "Don't Decay the Learning Rate, Increase the Batch Size," https://arxiv.org/abs/1711.00489v1, Nov. 2017, 11 pages.
Srivastava et al., "Dropout: A simple way to prevent neural networks from overfitting," The Journal of Machine Learning Research, Jun. 2014, 15:1929-1958.
Stollenga et al., "Deep Networks with Internal Selective Attention through Feedback Connections," Advances in Neural Information Processing Systems 27, 2014, 9 pages.
Strom, "Sparse Connection and Pruning in Large Dynamic Artificial Neural Networks," Fifth European Conference on Speech Communication and Technology, Sep. 1997, 4 pages.
Theis et al., "Faster Gaze Prediction with Dense Networks and Fisher Pruning," https://arxiv.org/abs/1801.05787v2, Jul. 2018, 18 pages.
Varelas et al., "A Comparative Study of Large-Scale Variants of CMA-ES," International Conference on Parallel Problem Solving from Nature, retrieved from URL <https://hal.inria.fr/hal-01881454/file/paper_170.pdf>, Sep. 2018, 13 pages.
Wan et al., "Regularization of Neural Networks using DropConnect," International Conference on Machine Learning, Feb. 2013, 9 pages.
Wierstra et al., "Natural Evolution Strategies," 2008 IEEE Congress on Evolutionary Computation, Jun. 2008, 3381-3387.
Wierstra et al., "Natural Evolution Strategies," Journal of Machine Learning Research, Mar. 2014, 15:949-980.
Williams, "Simple Statistical Gradient-Following Algorithms for Connectionist Reinforcement Learning," Machine Learning, May 1992, 8(3):229-256.
Yao, "Evolving Artificial Neural Networks," Proceedings of the IEEE, Sep. 1999, 87(9):1423-1447.
Zhang et al., "On the Relationship Between the OpenAI Evolution Strategy and Stochastic Gradient Descent," https://arxiv.org/abs/1712.06564, Dec. 2017, 13 pages.
Zhu et al., "To prune, or not to prune: exploring the efficacy of pruning for model compression," https://arxiv.org/abs/1710.01878v2, Nov. 2017, 11 pages.

* cited by examiner

LEARNING NON-DIFFERENTIABLE WEIGHTS OF NEURAL NETWORKS USING EVOLUTIONARY STRATEGIES

CROSS-REFERENCE TO RELATED APPLICATION

This application claims priority to U.S. Provisional Application No. 62/796,066, filed on Jan. 23, 2019. The disclosure of the prior application is considered part of and is incorporated by reference in the disclosure of this application.

BACKGROUND

This specification relates to training neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that trains a neural network that has both differentiable weights, i.e., the parameters and biases of the layers of the neural network, and non-differentiable weights.

According to an aspect, there is provided a method of training a neural network having a plurality of differentiable weights and a plurality of non-differentiable weights to determine trained values of the plurality of differentiable weights and the non-differentiable weights, the method comprising: maintaining (i) current values of the plurality of differentiable weights and (ii) current values of a plurality of distribution parameters; repeatedly performing the following operations: generating a plurality of non-differentiable weight value samples in accordance with the current values of the plurality of distribution parameters, wherein each non-differentiable weight sample defines a respective value for each of the non-differentiable weights; for each non-differentiable weight value sample: determining a fitness of the neural network when the values of the plurality of differentiable weights are set to the current values and the values of the plurality of non-differentiable weights are set to the values defined by the non-differentiable weight value sample, and determining, while the values of the plurality of differentiable weights are set to the current values and the values of the plurality of non-differentiable weights are set to the values defined by the non-differentiable weight value sample, an update to the current values of the plurality of differentiable weights using a machine learning gradient-based training technique; updating the current values of the differentiable weights using the updates determined for each of the non-differentiable weight value samples; determining, using an evolution strategies (ES) technique, an update to the current values of the plurality of distribution parameters using the fitness determined for each non-differentiable weight value sample; and updating the current values of the plurality of distribution parameters using the update to the current values of the plurality of distribution parameters.

The method may comprise the following features.

Determining a fitness of the neural network when the values of the plurality of differentiable weights are set to the current values and the values of the plurality of non-differentiable weights are set to the values defined by the non-differentiable weight value sample may comprise: obtaining a plurality of training inputs; processing each training input using the neural network with the values of the plurality of differentiable weights set to the current values and the values of the plurality of non-differentiable weights set to the values defined by the non-differentiable weight value sample to generate a respective network output for each training input; and evaluating, for each training input, an objective function that measures a quality of the network output.

Determining, while the values of the plurality of differentiable weights are set to the current values and the values of the plurality of non-differentiable weights are set to the values defined by the non-differentiable weight value sample, an update to the current values of the plurality of differentiable weights using a machine learning gradient-based training technique may comprise: determining, for each of the training inputs, a gradient with respect to the differentiable weights of the objective function through backpropagation; and determining, from the gradients for each of the training inputs, the update to the current values of the differentiable weights in accordance with the gradient-based training technique.

Updating the current values of the differentiable weights using the updates determined for each of the non-differentiable weight value samples may comprise: determining, for each differentiable weight, an average of the update for the weight in the updates determined for each of the non-differentiable weight value samples; and adding the averages to the current values.

Generating a plurality of non-differentiable weight value samples in accordance with the current values of the plurality of distribution parameters may comprise: generating, from the current values of the plurality of distribution parameters and for each non-differentiable weight, a respective probability distribution over possible values for the non-differentiable weight; and sampling the plurality of non-differentiable weight value samples from the probability distributions.

Determining, using an evolution strategies (ES) technique, an update to the current values of the plurality of distribution parameters using the fitness determined for each non-differentiable weight value sample may comprise: determining a utility for each non-differentiable weight value sample; determining, for each non-differentiable weight value sample, an approximate gradient with respect to each distribution parameter from the probability distributions and the utility for the non-differentiable weight value sample; and determining the update from the approximate gradients for the non-differentiable weight value samples.

The training may be performed by a distributed training system comprising a plurality of worker computing devices.

Each non-differentiable weight value sample may be assigned to a respective worker computing device and wherein each worker computing device determines the fitness and the updates to the current values of the differentiable weight values for the non-differentiable weight value samples assigned to the worker in parallel with each other worker computing device.

Each worker computing device may receive the current distribution parameters and may generate the non-differentiable weight value samples that are assigned to the worker computing device using the current distribution parameters.

Each worker may determine the utility for each non-differentiable weight value sample assigned to the worker only from the fitnesses for the non-differentiable weight value samples assigned to the worker and not from any fitness for any non-differentiable weight values sample assigned to other workers.

The non-differentiable weight values may comprise respective sparsity mask values for each of a plurality of the differentiable weights that define whether the differentiable weight is set to a zero value or a non-zero value after the neural network is trained, determining a fitness of the neural network when the values of the plurality of differentiable weights are set to the current values and the values of the plurality of non-differentiable weights are set to the values defined by the non-differentiable weight value sample may comprise: determining a fitness when the differentiable weights are masked such that each differentiable weight (i) has a zero value if the weight is set to a zero value according to the non-differentiable weight value sample and (ii) has the current value for the weight if the weight is set to a non-zero value according to the non-differentiable weight value sample, and determining, while the values of the plurality of differentiable weights are set to the current values and the values of the plurality of non-differentiable weights are set to the values defined by the non-differentiable weight value sample, an update to the current values of the plurality of differentiable weights using a machine learning gradient-based training technique may comprise: determining updates to the differentiable weights that are set to non-zero values according to the non-differentiable weight value sample while the differentiable weights are masked.

The distribution parameters may define a categorical distribution over the plurality of differentiable weights.

According to another aspect, there is provided one or more computer-readable storage media storing instructions that when executed by one or more computers cause the one or more computers to perform the respective operations of the above method aspect.

According to a further aspect, there is provided a system comprising one or more computers and one or more storage devices storing instructions that when executed by one or more computers cause the one or more computers to perform the respective operations of the above method aspect.

It will be appreciated that aspects can be combined and that features described in the context of one aspect may be combined with features described in the context of another aspect.

One branch of evolution strategies (ES) is distribution-based ES. In general, this provides a framework in which a distribution over a set of solutions or variables of interest is maintained and adapted. That is, candidate solutions may be sampled from the distribution, their fitness evaluated and the parameters of the distribution updated based upon the candidates and the fitness.

The subject matter described in this specification can be implemented in particular embodiments so as to realize one or more of the following advantages.

Evolution strategies (ES) can effectively be incorporated into a training process to additionally learn non-differentiable weights with only minimal excess overhead to the existing gradient-based technique used to learn the differentiable weights of a neural network. As will be described in detail below, ES is a black box optimization technique that maintains and adapts a distribution over the weights that are of interest (in this case, the non-differentiable weights of the neural network).

In particular, because, by employing the described techniques, ES can be used in parallel with the gradient-based training and the same objective function can be used to evaluate the fitness for ES and to determine the gradient-based weight updates, little additional computation is required to update the distribution parameters using ES relative to just updating the differentiable weights using gradient-based training.

As a particular example, when the non-differentiable weights are a sparsity mask, ES allows for training of models that are sparse from the first training step, so they can be much larger than when using conventional methods that require training dense models first. Thus, larger and better-performing models can be trained as compared to conventional techniques while consuming the same or fewer computational resources.

In addition, the training method is particularly suited for carrying out on a distributed system. As described in more detail below, the generation of samples and performance of updates at each worker reduces the amount of data communication required between workers and a central server and reduces the computational load on the central server. The method enables improved parallel processing performance and as such, the training method is particularly adapted to be performed by a distributed system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a system implemented as computer programs on one or more computers in one or more locations that trains a neural network that has both differentiable weights, i.e., the parameters and biases of the layers of the neural network, and non-differentiable weights.

In particular, the description below uses as an example a scenario where the non-differentiable weights are a sparsity mask over the differentiable weights, i.e., the non-differentiable weights define for each differentiable weight whether the value of the weight is set to zero after the neural network has been trained. In particular, after training, the non-differentiable weights are used to mask out, i.e., set to zero, values of certain ones of the differentiable weights. Masking out values of differentiable weights results in greatly reduced inference times, particularly when the trained neural network is deployed on special-purpose hardware, e.g., graphics processing units (GPUs), tensor processing units (TPUs), or other hardware accelerators. This is because the special-purpose hardware can be optimized to avoid performing multiplications that involve a masked out weight value without impacting the final output generated for any given neural network input. By using the described techniques to learn the sparsity mask, the system can effectively learn which differentiable weight values can be masked out without significantly impacting the quality of the outputs generated by the trained neural network.

Generally, however, the described techniques can be applied to any non-differentiable weights that may be included in a neural network. Other examples of non-differentiable weights include weights that define a connectivity of components within a neural network, e.g., whether a skip connection is included between two layers of the neural network, whether a given component, e.g., a given layer, is active or not once the neural network has been trained, or a weight to be assigned to the outputs of a given component during processing network inputs after the neural network has been trained.

The neural network can be configured to receive any kind of digital data input and to generate any kind of score, classification, or regression output based on the input.

In some cases, the neural network is a convolutional neural network that is configured to receive an input image and to process the input image to generate a network output for the input image, i.e., to perform some kind of image processing task. For example, the task may be image classification and the output generated by the neural network for a given image may be scores for each of a set of object categories, with each score representing an estimated likelihood that the image contains an image of an object belonging to the category. As another example, the task can be image embedding generation and the output generated by the neural network can be a numeric embedding of the input image. As yet another example, the task can be object detection and the output generated by the neural network can identify locations in the input image at which particular types of objects are depicted.

As another example, if the inputs to the neural network are Internet resources (e.g., web pages), documents, or portions of documents or features extracted from Internet resources, documents, or portions of documents, the task can be to classify the resource or document, i.e., the output generated by the neural network for a given Internet resource, document, or portion of a document may be a score for each of a set of topics, with each score representing an estimated likelihood that the Internet resource, document, or document portion is about the topic.

As another example, if the inputs to the neural network are features of an impression context for a particular advertisement, the output generated by the neural network may be a score that represents an estimated likelihood that the particular advertisement will be clicked on.

As another example, if the inputs to the neural network are features of a personalized recommendation for a user, e.g., features characterizing the context for the recommendation, e.g., features characterizing previous actions taken by the user, the output generated by the neural network may be a score for each of a set of content items, with each score representing an estimated likelihood that the user will respond favorably to being recommended the content item.

As another example, if the input to the neural network is a sequence of text in one language, the output generated by the neural network may be a score for each of a set of pieces of text in another language, with each score representing an estimated likelihood that the piece of text in the other language is a proper translation of the input text into the other language.

As another example, if the input to the neural network is a sequence representing a spoken utterance, the output generated by the neural network may be a score for each of a set of pieces of text, each score representing an estimated likelihood that the piece of text is the correct transcript for the utterance.

As another example, the neural network can be part of a reinforcement learning system or other control system and can generate outputs used for selecting actions to be performed by an agent interacting with an environment.

More generally, the neural network can be recurrent neural network or a feedforward neural network, e.g., a convolutional neural network or an attention-based neural network, or may have both recurrent and feedforward layers.

For example a neural network comprising recurrent neural network (RNN) trained as described herein may be configured to perform a speech recognition task, where an input sequence to the RNN is a sequence of audio data, e.g., raw audio data, and the trained RNN generates a sequence of phonemes or graphemes representing the input sequence. As another example, the RNN may be configured to perform a speech generation or text to speech task, where an input sequence to the RNN comprises text or graphemes and the trained RNN generates a sequence of audio data for speech representing the input sequence. As another example, the RNN may be configured to perform a language modeling task, where the input sequence is a sequence of phonemes or graphemes and the output sequence generated by the RNN is a sequence of words in a first natural language that represents the input sequence. As another example, the RNN may be configured to perform a machine translation task, where the input sequence is a sequence of words in a first natural language and the output sequence is a sequence of words in a second natural language that is a translation of the input sequence into the second natural language. As another example the RNN may be configured to classify parts of speech, words or phrases in an input sequence to perform a natural language processing task. As another example, the RNN can be configured to perform a compression task, where the input sequence is a sequence of data drawn from an input sample, e.g., audio data or image data, and the output sequence is a compressed or encoded sample. As another example, the RNN can be configured to perform a medical analysis task, where the input sequence is a sequence of health data for a particular patient, and the output sequence includes data that characterizes the health of the patient or predicts the future health of the patient.

A feedforward neural network trained as described herein may be configured to classify an input image (e.g., video) or audio data item to categorize the data item and/or to identify one or more component parts of the data item such as objects within an image or video or sounds within audio data. In a similar way feedforward neural network trained as described herein may be configured to classify input sensor data to categorize the sensor data and/or to identify one or more component parts of the sensor data. As another example a feedforward neural network trained as described herein may be configured to generate a data item such as an image (e.g. video) or audio data item. e.g., conditioned upon input data such as text or other data representing the data item to be generated. Such a feedforward neural network may comprise a convolutional neural network, e.g., a sparse convolutional neural network; the feedforward neural network may be autoregressive.

Figure 1:
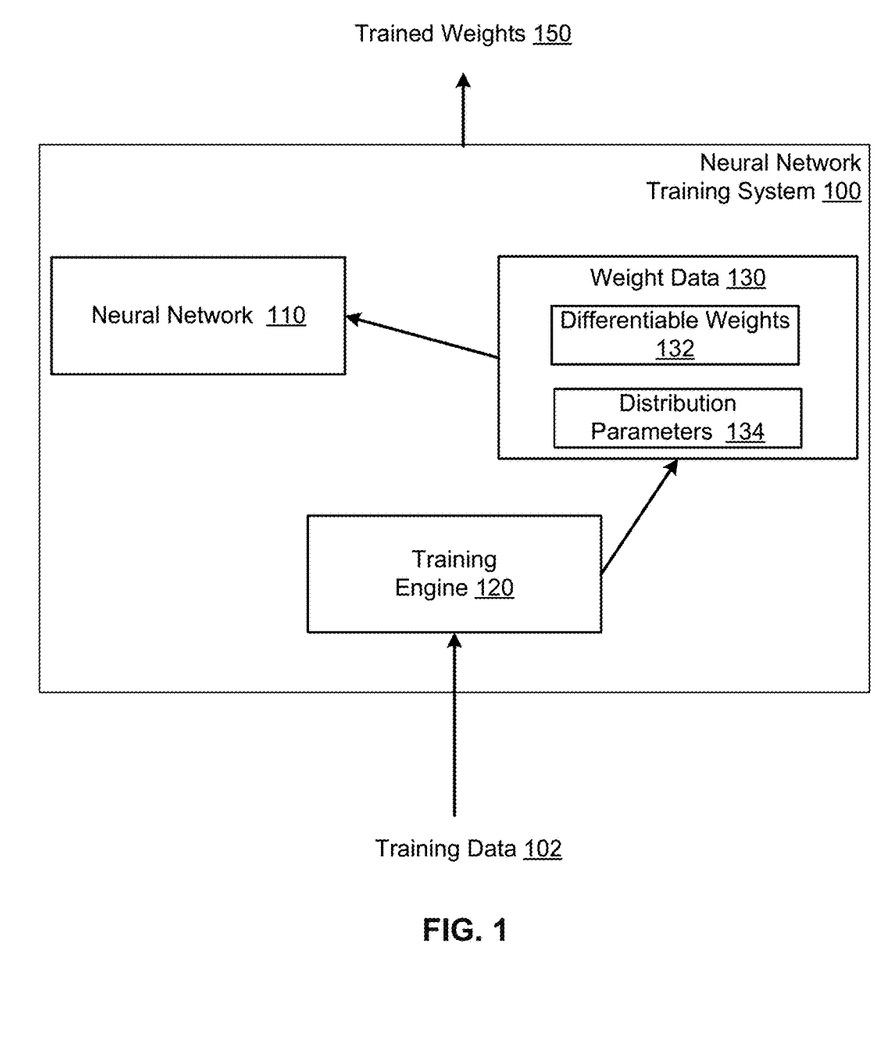
FIG. 1 shows an example neural network training system.

FIG. 1 shows an example neural network training system 100. The neural network training system 100 is an example of a system implemented as computer programs on one or more computers in one or more locations, in which the systems, components, and techniques described below can be implemented.

The neural network training system 100 is a system that receives, i.e., from a user of the system, training data 102 for training a neural network 110 to perform a machine learning task and uses the training data 102 to train the neural network to determine trained values 150 of the weights of the neural network 110.

As indicated above, the neural network 110 has both differentiable weights, i.e., the parameters and biases of the layers of the neural network, and non-differentiable weights.

In particular, the description below describes a scenario where the non-differentiable weights are a sparsity mask over the differentiable weights, i.e., define for each differentiable weight whether the value of the weight is set to zero after the neural network 110 has been trained.

However, the described techniques can be applied to any non-differentiable weights that may be included in a neural network. Other examples of non-differentiable weights are given above.

The training data 102 generally includes multiple training inputs and a respective target output for each training input. The target output for a given training input is the output that should be generated by the trained neural network by processing the given training input.

The system 100 can receive the training data 102 in any of a variety of ways. For example, the system 100 can receive training data as an upload from a remote user of the system over a data communication network, e.g., using an application programming interface (API) made available by the system 100. As another example, the system 100 can receive an input from a user specifying which data that is already maintained by the system 100 should be used as the training data 102.

During the training, the neural network training system 100 maintains and repeatedly updates weight data 130. At any given time during the training, the weight data 130 includes current values of the differentiable weights 132 and current values of a set of distribution parameters 134.

The differentiable weights include the parameters and biases of the neural network 110 that is being trained. Generally, the neural network being trained can have any architecture that is appropriate for the machine learning task that the neural network is being trained to perform, i.e., that allows the neural network to process network inputs that are the dimensions required by the task and generate network outputs that are dimensions required by the task. As a particular example, for image processing tasks, the neural network can be a convolutional neural network. As another particular example, for sequence generation tasks, i.e., tasks that require the neural network to generate outputs sequentially, the neural network can be an auto-regressive neural network, e.g., a recurrent neural network, an auto-regressive convolutional neural network, or a self-attention neural network.

The distribution parameters define a distribution from which values of the non-differentiable weights can be sampled. That is, the system can sample a value for each of the non-differentiable weights from a distribution defined by the distribution parameters.

Examples of distribution parameters and sampling non-differentiable weights using the distribution parameters are described below with reference to FIG. 2.

A training engine 120 within the system 100 iteratively trains the neural network 110, i.e., to determine trained values of the differentiable weights and to determine final distribution parameters.

Once final distribution parameters have been determined, the system 100 can sample or greedily select a final set of values for the non-differentiable weights using the final distribution parameters and include the final set of values for the non-differentiable weights in the trained values 150. That is, the trained values 150 include (i) the final set of values for the non-differentiable weights selected using the final distribution parameters and (ii) the final values of the differentiable weights.

More specifically, the training engine 120 updates the values of the distribution parameters using evolution strategies (ES) concurrently updating the values of the non-differentiable weights using a machine learning gradient-based training technique.

As will be described in detail below, ES is a black box optimization technique that maintains and adapts a distribution over the weights that are of interest (in this case, the non-differentiable weights of the neural network 110). A "black box" optimization technique is one that treats the objective function that is being optimized as a "black box" and does not require the objective function to be differentiable and, in fact, does not compute gradients of the objective function.

Updating the values of the distribution parameters using ES concurrently with learning differentiable weights as described in this specifically can allow the system 100 to effectively learn values for non-differentiable weights with minimal excess overhead to the existing gradient-based technique used to learn the differentiable weights of the neural network 110.

Training the neural network will be described in more detail below with reference to FIGS. 2-5.

Once the neural network training system 100 has generated the trained values 150, the neural network training system 100 can instantiate a trained neural network that has the trained weight values and use the trained neural network to process new received inputs to perform the machine learning task, e.g., through the API provided by the system. That is, the system 100 can receive inputs to be processed, use the trained neural network to process the inputs, and provide the outputs generated by the trained neural network or data derived from the generated outputs in response to the received inputs.

Instead or in addition, the system 100 can store the data 150 for later use in instantiating a trained neural network, or can transmit the data 150 to another system for use in instantiating a trained neural network, or output the data 150 to the user that submitted the training data.

Figure 2:
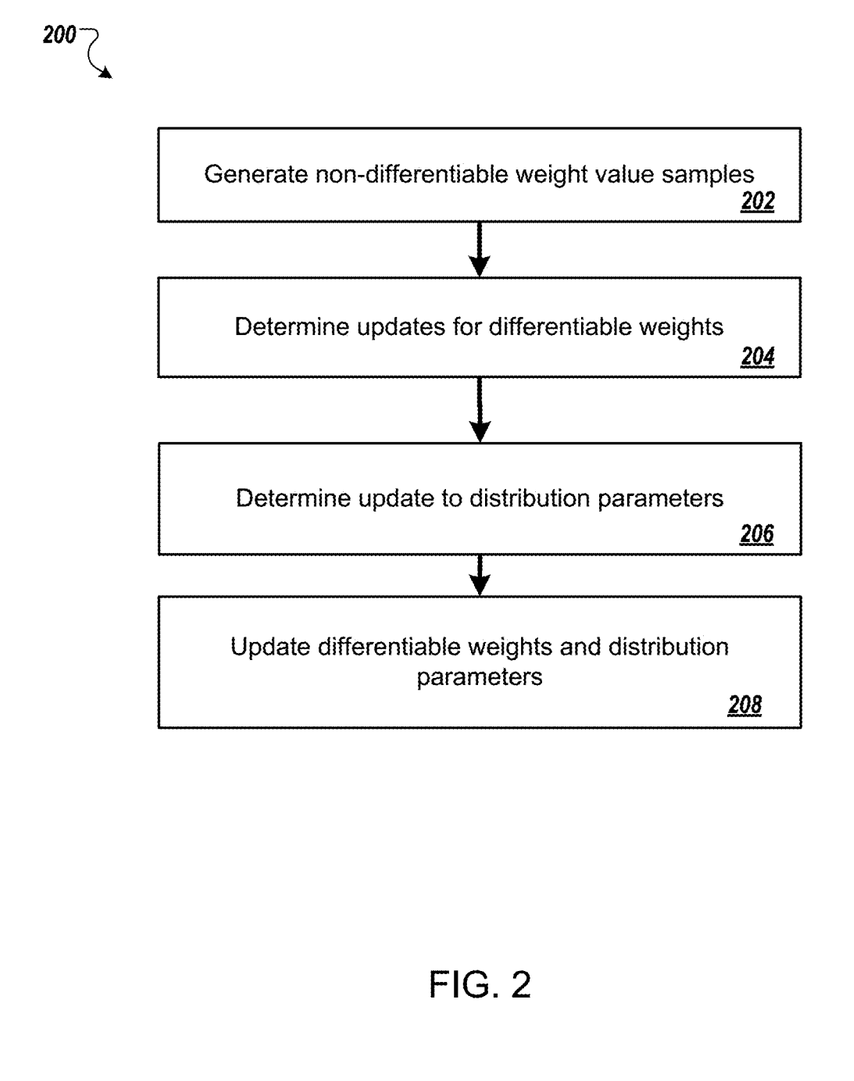
FIG. 2 is a flow diagram of an example process for training a neural network.

FIG. 2 is a flow diagram of an example process for training the neural network. For convenience, the process 200 will be described as being performed by a system of one or more computers located in one or more locations. For example, a neural network training system, e.g., the neural network training system 100 of FIG. 1, appropriately programmed in accordance with this specification, can perform the process 200.

The system can repeatedly perform the process 200 on different sets of training inputs from the training data to train the neural network. For example, the system can perform the process 200 until certain termination criteria are satisfied, e.g., until the performance of the neural network on the task has reached a threshold, until the differentiable weights of the neural network have converged, until a threshold number of iterations of the process 200 have been performed, or until a threshold amount of wall clock time has elapsed.

The system generates a plurality of non-differentiable weight value samples in accordance with the current values of the plurality of distribution parameters (step 202). Generally, each non-differentiable weight value sample defines a respective value for each of the non-differentiable weights.

In some implementations, to generate a given sample, the system samples, using the distribution parameters, a respective value for each of the non-differentiable weights.

In some other implementations, some of the non-differentiable weights are fixed. In these implementations, the system samples only values for those non-differentiable weights that are not fixed, and sets the remainder of the non-differentiable weights to the fixed value for that weight. For example, when the non-differentiable weights are a sparsity mask, some differentiable weights of the neural network may be constrained to not be masked, i.e., to not be set to zero, and the system can therefore set the non-differentiable weights for those differentiable weights to one while sampling values for the remainder of the non-differentiable weights.

As one example, when the non-differentiable weights are a sparsity mask, the distribution parameters can define a categorical distribution over the differentiable weights (that are not constrained to not be masked). In particular, the distribution parameters can include a respective parameter for each differentiable weight (that is not constrained to be masked) and the system can generate the categorical distribution over the differentiable weights by applying a softmax to the current values of the distribution parameters.

To generate a given non-differentiable weight value sample, the system can sample a fixed number of differentiable weights from the categorical distribution, with each differentiable weight that is sampled not being set to zero in the sparsity mask corresponding to the given sample. Because the system generates the non-differentiable weight value samples by sampling from the categorical distribution, each weight value sample, i.e., each sparsity mask, will generally select a different subset of the differentiable weights to mask out.

The system can generate the fixed number of samples in any of a variety of ways, e.g., by sampling without replacement when fixed sparsity is required from the outset or with replacement when fixed sparsity is not required, and using any implementation of a random sampler that is appropriate for the hardware on which the system is implemented.

As another example, when the non-differentiable weights are a sparsity mask, the distribution parameters can instead define a respective Bernoulli distribution for each differentiable weight (that is not constrained to not be masked). To generate a given weight value sample, the system can sample a zero (indicating that the differentiable weight is masked) or a one (indicating that the differentiable weight is not masked) for each differentiable weight from the corresponding Bernoulli distribution.

As yet another example, the non-differentiable weights may be continuous values from some range. In these implementations, the probability distribution for each weight can be a Gaussian distribution and the distribution parameters can include a respective mean and standard deviation for each non-differentiable weight. To generate a given weight value sample, the system can, for each non-differentiable weight, sample a respective noise value for the non-differentiable weight from a fixed distribution, e.g., the Normal distribution, and then set the value of the non-differentiable weight equal to the mean plus the product of the noise value and the standard deviation.

The system determines, for each non-differentiable weight value sample, a respective update to the current values of the plurality of differentiable weights (step 204). That is, the system determines multiple updates to the current differentiable weights, one for each non-differentiable weight value sample.

In particular, for each weight value sample, the system determines, while the values of the plurality of differentiable weights are set to the current values and the values of the plurality of non-differentiable weights are set to the values defined by the non-differentiable weight value sample, an update to the current values of the plurality of differentiable weights using a machine learning gradient-based training technique, i.e., using a training technique that computes gradients of an objective function with respect to the differentiable weights. For example, when the non-differentiable weights are a sparsity mask, the system determines, for each sparsity mask and while the differentiable weights are masked out according to the sparsity mask, an update to the current values of the plurality of differentiable weights using the gradient-based training technique.

Generally, the objective function can be any objective function that is appropriate for the particular task for which the neural network is being trained and that measures, for a given training input, the quality of the network output generated by the neural network for the training input relative to the target output for the training input. Examples of objective functions that may be appropriate for various tasks include cross-entropy losses and log-likelihood losses.

Determining the update to the differentiable weights for a given non-differentiable weight value sample is described in more detail below with reference to FIG. 3.

The system determines, for each non-differentiable weight value sample, a respective update to the current values of the distribution parameters (step 206).

Generally, the system determines the respective updates using an ES technique.

In particular, for each non-differentiable weight value sample, the system determines a fitness of the neural network when the values of the plurality of differentiable weights are set to the current values and the values of the plurality of non-differentiable weights are set to the values defined by the non-differentiable weight value sample. Generally, the fitness of the neural network is based on the values of the objective function on a set of training inputs. For example, the fitness can be the average of the values of the objective function for the set of training inputs.

For each non-differentiable weight value sample, the system determines, using the evolution strategies (ES) technique, an update to the current values of the plurality of distribution parameters using the fitness determined for the non-differentiable weight value sample. Thus, the same objective function and the same training inputs are used to determine both (i) the update to the distribution parameters and (ii) the update to the differentiable weights.

Determining the update using ES is described in more detail below with reference to FIG. 4.

The system updates the current values of the differentiable weights and the distribution parameters using the respective updates (step 208).

For example, for the differentiable weights, the system can sum or average the updates and then add the sum or average of the updates to the current values of the differentiable weights.

As another example, for the distribution parameters, the system can sum or average the updates and then add the sum or average to the current values of the distribution parameters.

Figure 3:
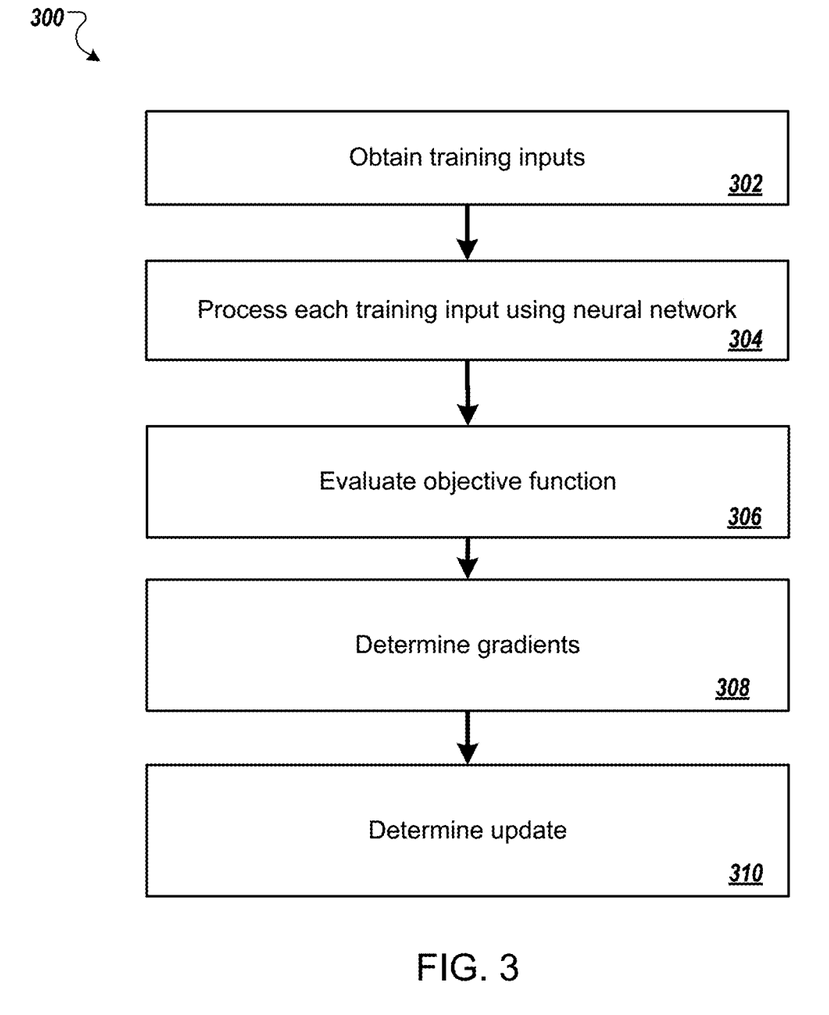
FIG. 3 is a flow diagram of an example process for determining an update to the current values of the differentiable weights.

FIG. 3 is a flow diagram of an example process 300 for determining an update to the current values of the differentiable weights for a given non-differentiable weight value sample. For convenience, the process 300 will be described as being performed by a system of one or more computers located in one or more locations. For example, a neural network training system, e.g., the neural network training system 100 of FIG. 1, appropriately programmed in accordance with this specification, can perform the process 300.

The system can perform the process 300 for each non-differentiable weight value sample generated at step 202. In particular, in some implementations, the system distributes the training of the neural network across multiple worker computing devices. In these implementations, each of the worker computing devices can perform the process 300 in parallel for a different subset of the non-differentiable weight value samples. That is, when there are b workers and n samples, each worker performs the process 300 for n/b of the samples in parallel.

The system obtains a set of training inputs and, for each training input, a corresponding target output (step 302).

The system processes each training input using the neural network with the values of the plurality of differentiable weights set to the current values and the values of the plurality of non-differentiable weights set to the values defined by the given non-differentiable weight value sample to generate a respective network output for each training input (step 304). For example, when the non-differentiable weights are a sparsity mask, the system processes each training input using the neural network with (i) any differentiable weight that is indicated as masked out by the sparsity mask corresponding to the given weight value sample set to zero and (ii) any differentiable that is indicated as not masked out by the sparsity mask corresponding to the given weight value sample set to the current value for the differentiable weight.

The system evaluates, for each training input, the objective function that measures a quality of the network output for the training input (step 306). That is, the system determines a value that of the objective function that represents the quality of the network output relative to the corresponding target output.

The system determines, for each of the training inputs, a gradient with respect to the differentiable weights of the objective function (step 308). The system can determine this gradient using the gradient-based training technique, e.g., through backpropagation.

The system determines, from the gradients for each of the training inputs, the update to the current values of the differentiable weights in accordance with the gradient-based training technique (step 310). The gradient-based training technique can be any technique that is appropriate for the task for which the neural network is being trained, e.g., Adam, rmsProp, or stochastic gradient descent. The system can determine the update in accordance with an update rule employed by the gradient-based training technique that determines how the gradients for the training inputs are combined to generate an update to the differentiable weights.

Figure 4:
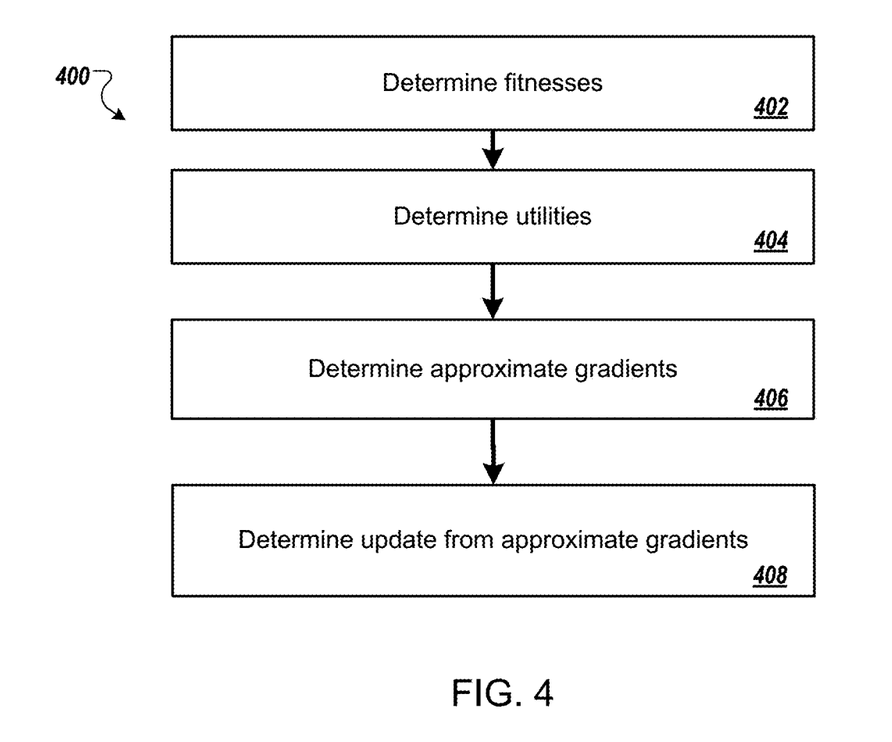
FIG. 4 is a flow diagram of an example process for determining an update to the current values of the distribution parameters using ES.

FIG. 4 is a flow diagram of an example process 400 for determining an update to the current values of the distribution parameters using ES. For convenience, the process 400 will be described as being performed by a system of one or more computers located in one or more locations. For example, a neural network training system, e.g., the neural network training system 100 of FIG. 1, appropriately programmed in accordance with this specification, can perform the process 400.

The system determines a respective fitness for each of the non-differentiable weight value samples (step 402). In particular, the system determines the fitness for a sample from the values of the objective function computed for the sample at step 306. For example, the fitness can be the average of the values of the objective function computed with the values of the plurality of differentiable weights set to the current values and the values of the plurality of non-differentiable weights set to the values defined by the given non-differentiable weight value sample. Thus, to compute the fitness, the system uses the same values of the objective function that are already required to be computed as part of the gradient-based training technique.

The system determines a utility for the non-differentiable weight value sample (step 404) from the fitnesses computed for the non-differentiable weight value samples.

Generally, the system computes utilities instead of directly using the fitnesses to normalize the fitnesses and make the updates computed more robust and scale-invariant. Mapping from a raw fitness to a utility may be performed using a fitness shaping function. In some implementations, the utility $u_i$ for a sample i satisfies:

$$u_i = \frac{\max\left(0, \left(\frac{k}{v}+1\right)-\log(\operatorname{rank}(f_i))\right)}{\sum_{j=1}^{k}\max\left(0, \log\left(\frac{k}{v}+1\right)-\log(j)\right)} - \frac{1}{k}$$

where v is a positive constant value, $f_i$ is the fitness for the sample i, and $\operatorname{rank}(f_i)$ is the rank of the fitness $f_i$ for the sample i among the k samples.

In some implementations, the k samples are all of the n samples computed at the current iteration of the process 200.

In some other implementations, however, when the training is distributed across b worker computing units, k is only the n/b samples assigned to the worker to which sample i is assigned. That is, each worker determines the utility for each non-differentiable weight value sample assigned to the worker only from the fitnesses for the non-differentiable weight value samples assigned to the worker and not from any fitness for any non-differentiable weight values sample assigned to other workers.

The system determines an approximate gradient with respect to each distribution parameter from the probability distribution and the utility for the non-differentiable weight value sample (step 406).

For example, when the non-differentiable weights are a sparsity mask, the approximate gradient with respect to the distribution parameters for the i-th weight value sample can satisfy:

$$u_i \cdot \frac{1-p}{\tau} \odot m_i,$$

where p is the probability distribution, $\odot$ denotes element-wise multiplication, i is a constant temperature value used in the softmax applied by the system to generate the probability distribution, and $m_i$ is the sparsity mask for the sample that includes a one for each value that is not masked out and a zero for each value that is masked out.

As another example, when the non-differentiable weights are continuous values and the distribution parameters include a mean and a standard deviation for each non-differentiable weight, the approximate gradient for the mean of a given non-differentiable weight can be the product of the utility and the noise value while the approximate gradient for the standard deviation for a given non-differentiable weight can be the product of the standard deviation, the utility, and the square of the difference between the noise value and one.

The system determines the update from the approximate gradients for the non-differentiable weight value samples (step 408). For example, the system can sum the approximate gradients and apply a learning rate to the sum to generate the update.

When the training of the neural network is distributed across multiple workers, the system can implement various optimizations that reduce the overhead introduced by also learning the non-differentiable weight values.

As one example and as described above, each worker can determine the utility for each non-differentiable weight value sample assigned to the worker only from the fitnesses for the non-differentiable weight value samples assigned to the worker and not from any fitness for any non-differentiable weight values sample assigned to other workers. In other words, some other ES schemes would require the utilities to be computed by, e.g., computing the rank of a given fitness among all of the fitnesses for all of the samples at the current iteration. This would incur additional communication cost, because the fitnesses would either all need to be communicated to a central server or to a designated one of the workers in order for the rank to be computed. Instead, each worker can compute the utilities for the weight value samples assigned to the worker without communicating with any of the other workers. As such, the efficiency of the parallel processing is improved.

As another example, to generate the multiple weight value samples as described with reference to step 202, each worker computing device can receive the current distribution parameters and generate the non-differentiable weight value samples that are assigned to the worker computing device using the current distribution parameters. Thus, instead of a central server needing to generate all n weight value samples before a given iteration of the process 200 can begin, each worker can generate the n/b samples assigned to the worker in parallel, reducing the latency and distributing the computation when generating the samples is computationally intensive. Thus, the efficiency of the parallel processing is further improved.

As yet another example, each worker can determine the fitnesses and then the updates to the distribution parameters for the n/b samples assigned to the worker in parallel with each other worker, i.e., instead of sending the fitnesses or utilities back to a central server to compute a full ranking. Thus, the central server only needs to combine, e.g., average or sum, the updates received from each worker and then apply the final update to the current distribution parameters.

As noted above, in some other ES schemes, the central server performs an update based upon all of the samples for the iteration. Where workers perform the generation of samples to minimize communication cost, the central server may not have access to the samples and may need to re-generate the samples to perform the update. This re-generation can be slow and computationally intensive. By having each worker perform n/b updates and then averaging the updates at the central server, the efficiency of the parallel processing can be greatly improved without impacting on final performance even though the update at each worker is only based upon a subset of the samples.

Figure 5:
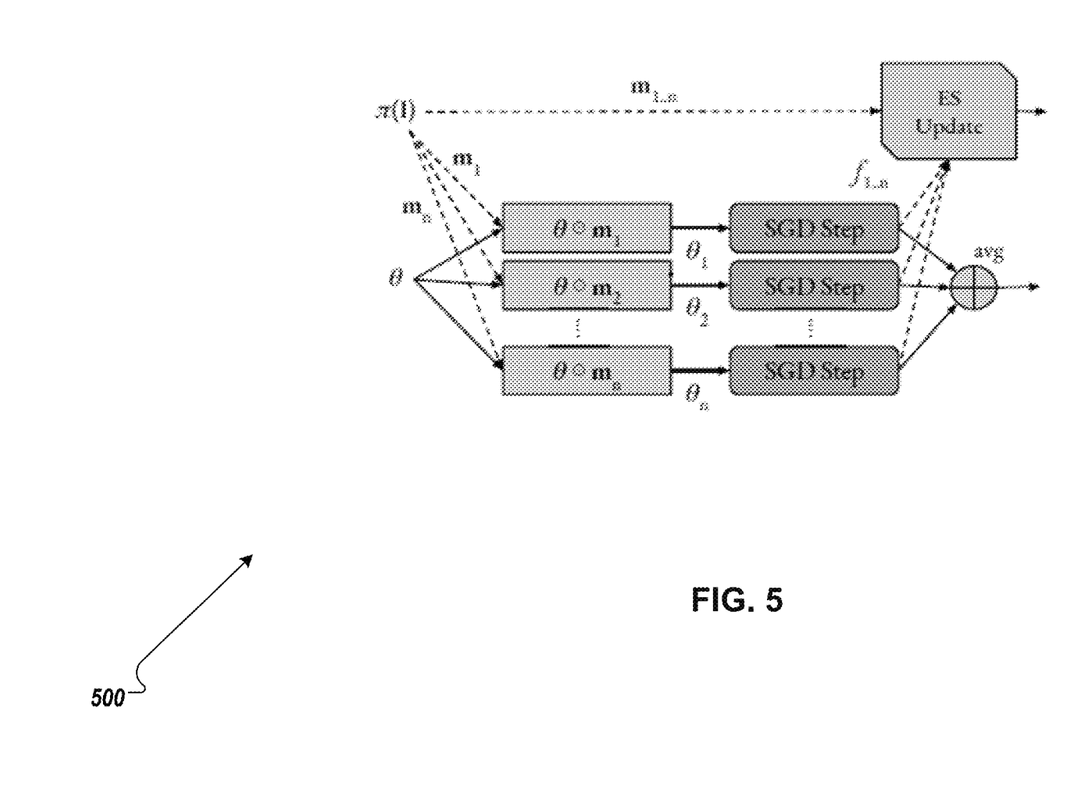
FIG. 5 illustrates an example iteration during the training of the neural network.

FIG. 5 shows an example 500 of an iteration of updating the distribution parameters and the differentiable weights when the non-differentiable weights are a sparsity mask. In the example of FIG. 5, the gradient-based training technique used to learn the differentiable weights is stochastic gradient descent (SGD).

As shown in FIG. 5, the iteration begins with the system generating a categorical distribution $\pi$ over the differentiable weights $\theta$ from the current values of the distribution parameters l.

Using the distribution $\pi$, the system generates n sparsity masks $m_l$ through $m_n$. For each sparsity mask $m_i$, the system applies the sparsity mask to the current values of the differentiable weights $\theta$ to generate a set of masked out values for the differentiable weights $\theta_i$.

The system then performs a step of SGD ("SGD Step") for each sparsity mask $m_i$ (with the masked out values $\theta_i$ used for the differentiable weights), i.e., as described above with reference to FIG. 3.

As a result of the step of SGD, the system determines (i) a fitness $f_i$ and (ii) an update to the differentiable weights. The system averages the updates to the differentiable weights and then applies the averaged update to generate updated values of the differentiable weights.

The system also uses the fitnesses $f_1$ through $f_n$ to update the distribution parameters l using ES ("ES update").

Thus, as can be seen from FIG. 5, updating the distribution parameters/introduces only minimal overhead to the training process—the fitness used for the ES update are generated from data that is already computed during the SGD steps to update the current values of the differentiable weights. Additionally, incorporating the ES update results in higher quality updates to the differentiable weights, i.e., because weights are kept to a desired sparsity throughout the training and at each iteration updates can be computed with multiple different subsets of weights masked out.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network having a plurality of differentiable weights and a plurality of non-differentiable weights to determine trained values of the plurality of differentiable weights and the plurality of non-differentiable weights, the method comprising:
    maintaining (i) current values of the plurality of differentiable weights and (ii) current values of a plurality of distribution parameters;
    repeatedly performing the following operations:
    generating a plurality of non-differentiable weight value samples in accordance with the current values of the plurality of distribution parameters, wherein each non-differentiable weight value sample of the plurality of non-differentiable weight value samples defines a respective value for each of the plurality of non-differentiable weights of the neural network;
    assigning each of the plurality of non-differentiable weight value samples to a respective worker computing device of a plurality of worker devices;
    for each non-differentiable weight value sample of the plurality of non-differentiable weight value samples:
        determining, by the respective worker computing device to which the non-differentiable weight value sample is assigned, a fitness of the neural network when the plurality of differentiable weights are set to the current values of the plurality of differentiable weights and the plurality of non-differentiable weights are set to the respective values defined by the non-differentiable weight value sample, and
        determining, by the respective worker computing device to which the non-differentiable weight value sample is assigned and while the plurality of differentiable weights are set to the current values of the plurality of differentiable weights and the plurality of non-differentiable weights are set to the respective values defined by the non-differentiable weight value sample, a respective update to the current values of the plurality of differentiable weights using a machine learning gradient-based training technique;
    updating the current values of the plurality of differentiable weights using the respective update to the current values of the plurality of differentiable weights determined for each of the non-differentiable weight value samples;
    determining, using an evolution strategies (ES) technique, an update to the current values of the plurality of distribution parameters using the fitness determined for each non-differentiable weight value sample; and
    updating the current values of the plurality of distribution parameters using the update to the current values of the plurality of distribution parameters.

2. The method of claim 1, wherein determining the fitness of the neural network when the plurality of differentiable weights are set to the current values of the plurality of differentiable weights and the plurality of non-differentiable weights are set to the respective values defined by the non-differentiable weight value sample comprises:
    obtaining a plurality of training inputs;
    processing each training input using the neural network with the plurality of differentiable weights set to the current values of the plurality of differentiable weights and the plurality of non-differentiable weights set to the respective values defined by the non-differentiable weight value sample to generate a respective network output for each training input; and evaluating, for each training input, an objective function that measures a quality of the network output.

3. The method of claim 2, wherein determining, while the plurality of differentiable weights are set to the current values of the plurality of differentiable weights and the plurality of non-differentiable weights are set to the respective values defined by the non-differentiable weight value sample, the update to the current values of the plurality of differentiable weights using the machine learning gradient-based training technique comprises:

determining, for each of the training inputs, a respective gradient with respect to the plurality of differentiable weights of the objective function through backpropagation; and determining, from the respective gradient for each of the training inputs, the update to the current values of the differentiable weights in accordance with the gradient-based training technique.

4. The method of claim 1, wherein updating the current values of the plurality of differentiable weights using the respective update to the current values of the plurality of differentiable weights determined for each of the non-differentiable weight value samples comprises:

determining, for each of the plurality of differentiable weights, an average of the respective update for the differentiable weight in the respective updates to the current values of the plurality of differentiable weights determined for each of the non-differentiable weight value samples; and for each of the plurality of differentiable weights, adding the average determined for the differentiable weight to a current value of the differentiable weight.

5. The method of claim 1, wherein generating the plurality of non-differentiable weight value samples in accordance with the current values of the plurality of distribution parameters comprises:

generating, from the current values of the plurality of distribution parameters and for each of the plurality of non-differentiable weights, a respective probability distribution over possible values for the non-differentiable weight; and sampling the plurality of non-differentiable weight value samples from the respective probability distributions for each of the plurality of non-differentiable weights.

6. The method of claim 5, wherein determining, using the evolution strategies (ES) technique, the update to the current values of the plurality of distribution parameters using the fitness determined for each non-differentiable weight value sample comprises:

determining a utility for each non-differentiable weight value sample;

determining, for each non-differentiable weight value sample, a respective approximate gradient with respect to each distribution parameter from the probability distributions and the utility for the non-differentiable weight value sample; and determining the update to the current values of the plurality of distribution parameters from the respective approximate gradients for each of the non-differentiable weight value samples.

7. The method of claim 1, wherein each worker computing device determines the fitness and the respective update to the current values of the plurality of differentiable weights for each of the non-differentiable weight value samples assigned to the worker in parallel with each other worker computing device.

8. The method of claim 1, wherein each worker computing device receives the current values of the plurality of distribution parameters and generates the non-differentiable weight value samples that are assigned to the worker computing device using the current values of the plurality of distribution parameters.

9. The method of claim 8, wherein each worker computing device determines a utility for each non-differentiable weight value sample assigned to the worker only from the fitnesses for the non-differentiable weight value samples assigned to the worker and not from any fitness for any non-differentiable weight values sample assigned to other workers.

10. The method of claim 1,
wherein the non-differentiable weight values comprise respective sparsity mask values for each respective differentiable weight of a plurality of the differentiable weights that define whether the respective differentiable weight is set to a zero value or a non-zero value after the neural network is trained, wherein determining the fitness of the neural network when the values of the plurality of differentiable weights are set to the current values and the values of the plurality of non-differentiable weights are set to the values defined by the non-differentiable weight value sample comprises:

determining a fitness when the differentiable weights are masked such that each respective differentiable weight (i) has a zero value if the respective differentiable weight is set to a zero value according to the non-differentiable weight value sample and (ii) has a current value for the respective differentiable weight if the respective differentiable weight is set to a non-zero value according to the non-differentiable weight value sample, and wherein determining, while the values of the plurality of differentiable weights are set to the current values and the values of the plurality of non-differentiable weights are set to the values defined by the non-differentiable weight value sample, the update to the current values of the plurality of differentiable weights using the machine learning gradient-based training technique comprises:

determining updates to the differentiable weights that are set to non-zero values according to the non-differentiable weight value sample while the differentiable weights are masked.

11. The method of claim 10, wherein the distribution parameters define a categorical distribution over the plurality of differentiable weights.

12. One or more non-transitory computer-readable storage media storing instructions that when executed by one or more computers cause the one or more computers to perform operations for training a neural network having a plurality of differentiable weights and a plurality of non-differentiable weights to determine trained values of the plurality of differentiable weights and the plurality of non-differentiable weights, the operations comprising:

maintaining (i) current values of the plurality of differentiable weights and (ii) current values of a plurality of distribution parameters;

repeatedly performing the following operations:

generating a plurality of non-differentiable weight value samples in accordance with the current values of the plurality of distribution parameters, wherein each non-differentiable weight value sample of the plurality of non-differentiable weight value samples defines a respective value for each of the plurality of non-differentiable weights of the neural network;

assigning each of the plurality of non-differentiable weight value samples to a respective worker computing device of a plurality of worker devices;

for each non-differentiable weight value sample of the plurality of non-differentiable weight value samples:
determining, by the respective worker computing device to which the non-differentiable weight value sample is assigned, a fitness of the neural network when the plurality of differentiable weights are set to the current values of the plurality of differentiable weights and the plurality of non-differentiable weights are set to the respective values defined by the non-differentiable weight value sample, and
determining, by the respective worker computing device to which the non-differentiable weight value sample is assigned and while the plurality of differentiable weights are set to the current values of the plurality of differentiable weights and the plurality of non-differentiable weights are set to the respective values defined by the non-differentiable weight value sample, a respective update to the current values of the plurality of differentiable weights using a machine learning gradient-based training technique;

updating the current values of the plurality of differentiable weights using the respective update to the current values of the plurality of differentiable weights determined for each of the non-differentiable weight value samples;

determining, using an evolution strategies (ES) technique, an update to the current values of the plurality of distribution parameters using the fitness determined for each non-differentiable weight value sample; and updating the current values of the plurality of distribution parameters using the update to the current values of the plurality of distribution parameters.

13. A system comprising one or more computers and one or more non-transitory storage devices storing instructions that when executed by one or more computers cause the one or more computers to perform operations for training a neural network having a plurality of differentiable weights and a plurality of non-differentiable weights to determine trained values of the plurality of differentiable weights and the plurality of non-differentiable weights, the operations comprising:

maintaining (i) current values of the plurality of differentiable weights and (ii) current values of a plurality of distribution parameters;

repeatedly performing the following operations:

generating a plurality of non-differentiable weight value samples in accordance with the current values of the plurality of distribution parameters, wherein each non-differentiable weight value sample of the plurality of non-differentiable weight value samples defines a respective value for each of the plurality of non-differentiable weights of the neural network;

assigning each of the plurality of non-differentiable weight value samples to a respective worker computing device of a plurality of worker devices;

for each non-differentiable weight value sample of the plurality of non-differentiable weight value samples:
determining, by the respective worker computing device to which the non-differentiable weight value sample is assigned, a fitness of the neural network when the plurality of differentiable weights are set to the current values of the plurality of differentiable weights and the plurality of non-differentiable weights are set to the respective values defined by the non-differentiable weight value sample, and
determining, by the respective worker computing device to which the non-differentiable weight value sample is assigned and while the plurality of differentiable weights are set to the current values of the plurality of differentiable weights and the plurality of non-differentiable weights are set to the respective values defined by the non-differentiable weight value sample, a respective update to the current values of the plurality of differentiable weights using a machine learning gradient-based training technique;

updating the current values of the plurality of differentiable weights using the respective update to the current values of the plurality of differentiable weights determined for each of the non-differentiable weight value samples;

determining, using an evolution strategies (ES) technique, an update to the current values of the plurality of distribution parameters using the fitness determined for each non-differentiable weight value sample; and updating the current values of the plurality of distribution parameters using the update to the current values of the plurality of distribution parameters.

14. The system of claim 13, wherein determining the fitness of the neural network when the plurality of differentiable weights are set to the current values of the plurality of differentiable weights and the plurality of non-differentiable weights are set to the respective values defined by the non-differentiable weight value sample comprises:

obtaining a plurality of training inputs;

processing each training input using the neural network with the plurality of differentiable weights set to the current values of the plurality of differentiable weights and the plurality of non-differentiable weights set to the respective values defined by the non-differentiable weight value sample to generate a respective network output for each training input; and evaluating, for each training input, an objective function that measures a quality of the network output.

15. The system of claim 14, wherein determining, while the plurality of differentiable weights are set to the current values of the plurality of differentiable weights and the plurality of non-differentiable weights are set to the respective values defined by the non-differentiable weight value sample, the update to the current values of the plurality of differentiable weights using the machine learning gradient-based training technique comprises:

determining, for each of the training inputs, a respective gradient with respect to the plurality of differentiable weights of the objective function through backpropagation; and determining, from the respective gradient for each of the training inputs, the update to the current values of the differentiable weights in accordance with the gradient-based training technique.

16. The system of claim 13, wherein updating the current values of the plurality of differentiable weights using the respective update to the current values of the plurality of differentiable weights determined for each of the non-differentiable weight value samples comprises:

determining, for each of the plurality of differentiable weights, an average of the respective update for the differentiable weight in the respective updates to the current values of the plurality of differentiable weights determined for each of the non-differentiable weight value samples; and for each of the plurality of differentiable weights, adding the average determined for the differentiable weight to the current value of the differentiable weight.

17. The system of claim 13, wherein generating the plurality of non-differentiable weight value samples in accordance with the current values of the plurality of distribution parameters comprises:

generating, from the current values of the plurality of distribution parameters and for each of the plurality of non-differentiable weights, a respective probability distribution over possible values for the non-differentiable weight; and sampling the plurality of non-differentiable weight value samples from the respective probability distributions for each of the plurality of non-differentiable weights.

18. The system of claim 17, wherein determining, using the evolution strategies (ES) technique, the update to the current values of the plurality of distribution parameters using the fitness determined for each non-differentiable weight value sample comprises:

determining a utility for each non-differentiable weight value sample;

determining, for each non-differentiable weight value sample, a respective approximate gradient with respect to each distribution parameter from the probability distributions and the utility for the non-differentiable weight value sample; and determining the update to the current values of the plurality of distribution parameters from the respective approximate gradients for each of the non-differentiable weight value samples.

19. The system of claim 13, wherein each worker computing device determines the fitness and the respective update to the current values of the plurality of differentiable weights for each of the non-differentiable weight value samples assigned to the worker in parallel with each other worker computing device.

20. The system of claim 13, wherein each worker computing device receives the current values of the plurality of distribution parameters and generates the non-differentiable weight value samples that are assigned to the worker computing device using the current values of the plurality of distribution parameters.

* * * * *

UNITED STATES PATENT AND TRADEMARK OFFICE
CERTIFICATE OF CORRECTION

| | | |
|---|---|---|
| PATENT NO. | : 11,676,035 B2 | Page 1 of 1 |
| APPLICATION NO. | : 16/751169 | |
| DATED | : June 13, 2023 | |
| INVENTOR(S) | : Lenc et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this
Thirty-first Day of December, 2024

Derrick Brent
*Acting Director of the United States Patent and Trademark Office*